United States Patent
Park

(10) Patent No.: US 7,517,096 B2
(45) Date of Patent: Apr. 14, 2009

(54) PROJECTION DISPLAY SYSTEM WITH MICRO-MIRROR LIGHT MODULATOR

(75) Inventor: Chan Young Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 273 days.

(21) Appl. No.: 11/241,180

(22) Filed: Sep. 30, 2005

(65) Prior Publication Data

US 2006/0072079 A1   Apr. 6, 2006

(30) Foreign Application Priority Data

Oct. 6, 2004 (KR) ............... 10-2004-0079445

(51) Int. Cl.
G03B 21/26 (2006.01)
G03B 21/28 (2006.01)
H04N 5/74 (2006.01)
G02B 26/08 (2006.01)
G02F 1/29 (2006.01)

(52) U.S. Cl. ............... 353/99; 353/94; 348/771; 359/197; 359/226; 359/292; 359/298; 359/202

(58) Field of Classification Search ......... 348/770–771; 353/94, 98–99; 359/196–198, 223–226, 359/290–292, 298, 202
See application file for complete search history.

(56) References Cited

U.S. PATENT DOCUMENTS 6,137,623 A * 10/2000 Roberson et al. ............ 359/291
6,351,324 B1 * 2/2002 Flint ....................... 359/202
6,577,429 B1 * 6/2003 Kurtz et al. ................ 359/279
6,661,561 B2 * 12/2003 Fitzpatrick et al. .......... 359/291
6,940,630 B2 * 9/2005 Xie ........................ 359/290
6,977,765 B1 * 12/2005 Yeo ........................ 359/291
7,006,276 B2 * 2/2006 Starkweather et al. ...... 359/290

* cited by examiner

Primary Examiner—Diane I Lee
Assistant Examiner—Magda Cruz
(74) Attorney, Agent, or Firm—Workman Nydegger

(57) ABSTRACT

A micro-mirror light modulator and associated projection display system. The projection display system includes a light source, a linear light source illumination system that transforms a light emitted from the light source into a thin linear light, a micro-mirror light modulator that selectively diverts the direction of the incident thin linear light to create reflected light, a light transmitting layer that selectively transmits or filters out the reflected light, a condenser lens that focuses the light transmitted by the light transmitting layer, and a scanner that scans the focused light such that the light forms a projected image. The micro-mirror light modulator includes a reflection electrode that deflects toward an electrode when a voltage is applied. The reflection electrode reflects light depending on its deflection state. The micro-mirror light modulator is driven by low voltage, is easily fabricated such that the cost is reduced, and exhibits enhanced image contrast.

19 Claims, 7 Drawing Sheets

PROJECTION DISPLAY SYSTEM WITH MICRO-MIRROR LIGHT MODULATOR his application claims the benefit of the Korean Patent Application No. 10-2004-0079445, filed on Oct. 6, 2004 which is hereby incorporated herein by reference as if fully set forth herein.

BACKGROUND OF THE INVENTION

1. Field of the Invention

The present invention relates to a projection display system having a light modulator display device, and more particularly, to a micro-mirror light modulator and projection display system using the same. Although the present invention is suitable for a wide scope of applications, it is particularly suitable for displaying an image by modulating a luminous intensity of pixels by means of micro-mirrors.

2. Discussion of the Related Art

Generally, projection display systems display a wide image on a wide screen by enlarging and projecting a small image. An example of a conventional projection display system is an LCD (liquid crystal display) projection display system that uses a lamp and LCD display device.

FIG. 1 is a schematic diagram of a conventional LCD projection display system. Referring to FIG. 1, in a basic configuration of an LCD projection display system in the prior art, a light emitted from a lamp 11 is collimated in one direction by a reflector. A red light is transmitted through a red filter 12, whereas green and blue lights are reflected by the red filter 12.

The red light is reflected by a red mirror 13 to be irradiated onto an R-LCD (Red LCD) 17, the green light is reflected by a blue filter 14 to be irradiated onto a G-LCD (Green LCD) 18, and the blue light is transmitted through the blue filter 14. The projected blue light is reflected by a first blue mirror 15 and a second blue mirror 16 to be irradiated onto a B-LCD (Blue-LCD) 19.

Each of the R-, G- and B-LCDs 17, 18 and 19 displays an image for each color in response to an electrical signal in which the corresponding image is encoded. The images of the respective colors are combined by a prism 20. The combined color image is projected to a projection optical system 21 so that the projected image can be viewed on a screen 22.

The LCD display device, which has a relatively slow response speed, exhibits the problem of causing image artifacts when displaying a fast-moving picture. In addition, when the LCD display device operates to render a dark pixel in response to an off value of the electrical signal, the liquid crystal layer of the LCD display device generally is unable to completely block the light of the pixel. This dark state light leakage typically reduces the contrast of LCD projection display systems.

Conventional LCD projection display devices typically include optical systems with color separation and combination systems that increase the complexity and the overall size of the projection display devices.

FIG. 2 is a perspective diagram of a DMD (digital micro-mirror device) according to a related art. Referring to FIG. 2, a DMD is fabricated by covering each memory cell of a CMOS SRAM with a micro-mirror. The DMD is configured to have a pair of micro-mirrors 23 and 23' for one memory cell. One mirror 23 is rotated by +10° while the other 23' is rotated by −10°. A binary state of '0' or '1' is represented in each basic memory cell.

In FIG. 2, reference numbers 25, 26, 27, 28, 29, 30 and 31 indicate a yoke landing tip, support post, tension hinge, yoke, mirror landing electrode, yoke address electrode and mirror address electrode, respectively.

The DMD having the above configured memory cells is fabricated by regularly arranging 100,000~10,000,000 micro-mirrors in width and length directions according to a semiconductor process. By controlling the tilt of each of the mirrors by ±10° according to a voltage applied to each of the mirrors, the intensity of the light reflected by the corresponding mirror is adjusted to implement video information of each pixel.

Namely, an on-state light is reflected in the direction of the projection lens (not shown in the drawing) with a specific angle by the micro-mirrors 23 and 23' moving in a diagonal direction, whereas an off-state light is reflected with an opposite angle in a direction away from the projection lens. Hence, the DMD can be used as a spatial light modulator.

However, as can be seen in FIG. 2, the configuration of the DMD is complicated and three-dimensional. Hence, the fabrication throughput of the DMD is low, which makes the DMD relatively expensive.

Alternatively, the projection display system may include a GLV (grating light valve), which is a display device employing micro-ribbons. FIG. 3A is a schematic perspective diagram of a GLV. Referring to FIG. 3A, a set of six ribbons 33 and 34 forms one pixel 100. The ribbons 33 and 34 are alternately arranged. In this case, operational ribbons 33 are moved by an electrode 32, whereas fixed ribbons 34 are not moved by the electrode 32. In the above configuration, 100~10,000 micro-ribbons are arranged by a semiconductor process to form a linear display device, which can be used to render an image on a line of pixels.

FIG. 3B is a diagram of a projection display system employing the above configured GLV. Referring to FIG. 3B, the projection display system includes a first condenser lens 35 for focusing the R, G and B components of the image, a GLV 36 with three rows of pixel elements (i.e., R, G, B), a second condenser lens 37 for focusing the light from the GLV 36, and a scanner 38 for scanning the light from the second condenser lens 37 onto a screen 39.

When a voltage is applied to the above configured projection display system, the operational ribbons 33, to which the voltage is applied, are deflected downward while the fixed ribbons 34 do not move. Thus, this configuration of ribbons forms a grating with a periodic step shape in height. As the R, G and B light components are directed onto the GLV 36 via the first condenser lens 35, the grating diffracts the light.

The light diffracted by the GLV 36 is scanned by the scanner 38 to effectively convert the one-dimensional array of pixels associated with the GLV 36 to an image projected onto the screen 39 as a two-dimensional array of pixels.

In the projection display system employing the GLV, the GLV has a hollow solid shape. However, the deflected operational ribbons 33 contact the substrate over a relatively large area, which often results in sticking of the deflected operational ribbons 33 with the substrate. Moreover, a high voltage is needed to move the relatively wide ribbons.

SUMMARY OF THE INVENTION

Accordingly, the present invention is directed to a micro-mirror light modulator and projection display system using the same that substantially obviate one or more problems due to limitations and disadvantages of the related art. The projection display systems of the present invention include a micro-mirror light modulator that modulates a linear light source by selectively reflecting the linear light in response to an electrical signal that encodes an image.

The micro-mirror elements of the micro-mirror light modulator include a reflecting electrode displaced from an electrode. When no voltage is applied, the reflecting electrode is substantially horizontal and parallel with respect to the electrode. When the voltage is applied, the reflecting electrode tilts and is deflected downward toward the electrode. This tilting or deflection of the reflecting electrode permits the direction of reflection of incident light to be selected, which permits the luminous intensity of the light associated with the individual pixels of the projection display system to be modulated.

The micro-mirror light modulator includes a linear array of pixel elements that correspond to the pixels in one row or column of the two-dimensional screen of the projection display system. The two-dimensional image is formed on the screen by scanning a sequence of linear images generated by the micro-mirror light modulator.

In contrast to conventional GLV projection display devices, the micro-mirrors of the present invention do not exhibit sticking problems. The sticking is eliminated primarily because the electrode contacts a substrate of the reflecting electrode rather than the reflecting electrode itself, and the contact area of the electrode is relatively small. Moreover, the voltage required to activate the micro-mirror elements is relatively small, and switching times are short. In addition, the three-dimensional shape of the micro-mirror elements is relatively simple, which makes fabrication easier and results in a relatively low-cost projection display system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
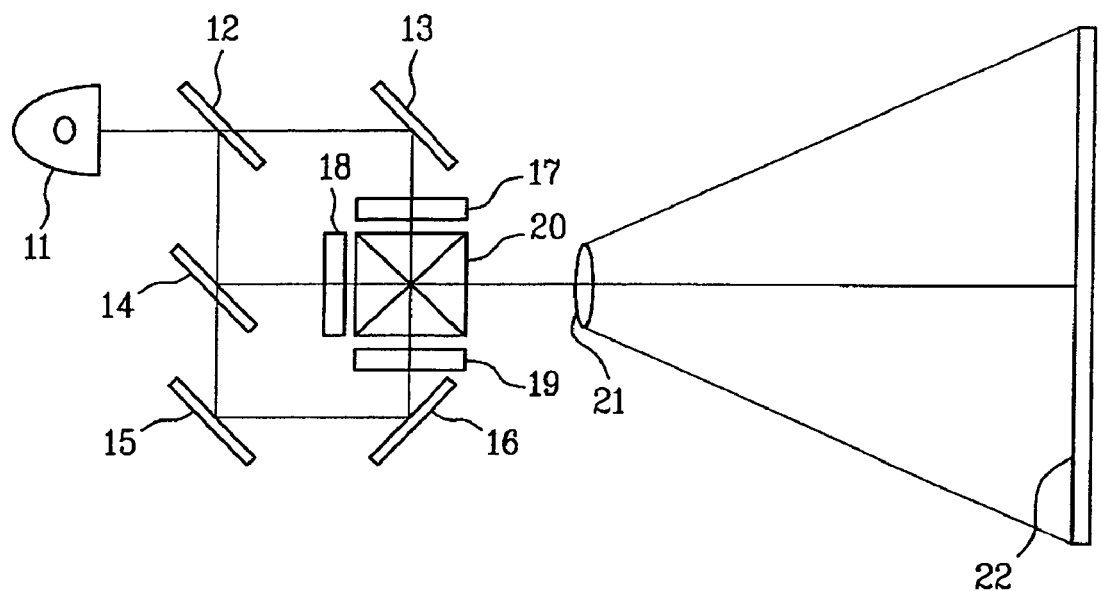
FIG. 1 is a schematic diagram of a conventional LCD projection display system.
Figure 2:
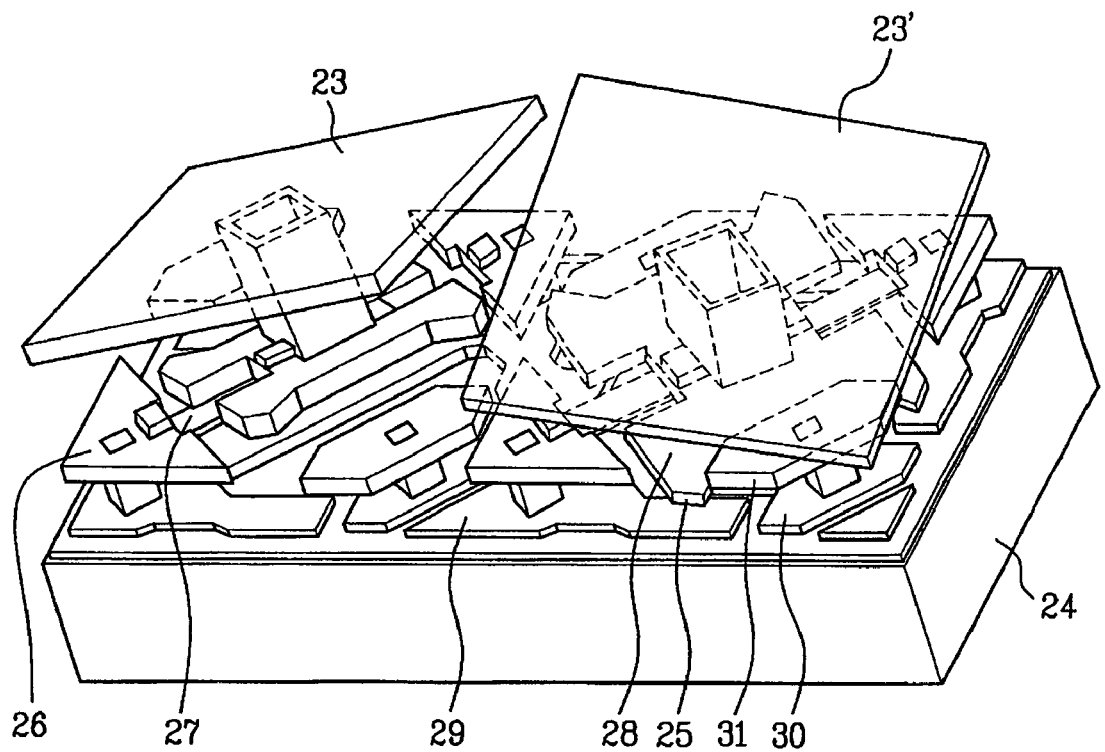
FIG. 2 is a perspective diagram of a prior art DMD structure.
Figure 3A:
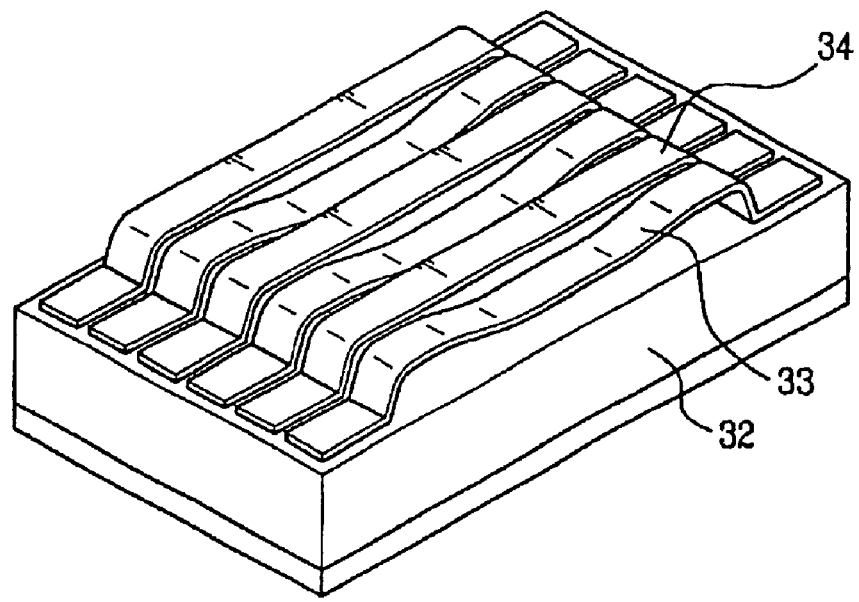
FIG. 3A is a schematic perspective diagram of a GLV structure.
Figure 3B:
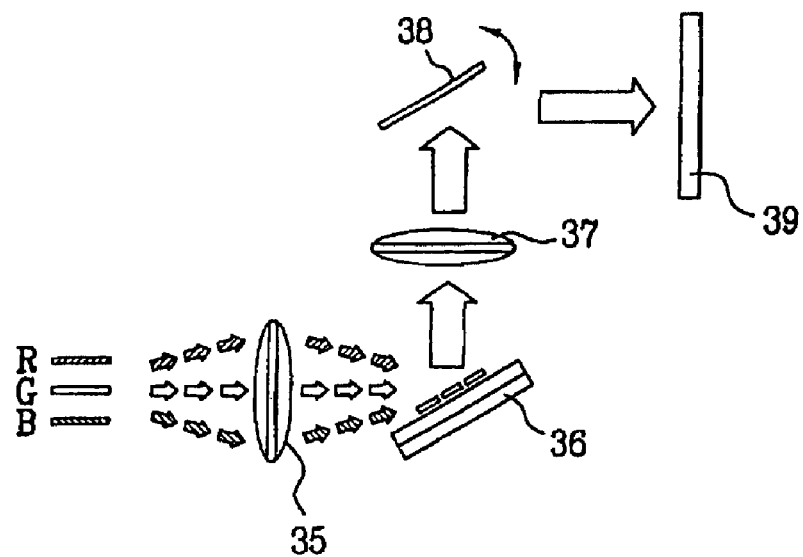
FIG. 3B is a diagram of a projection display system employing the GLV in FIG. 3A.
Figure 4:
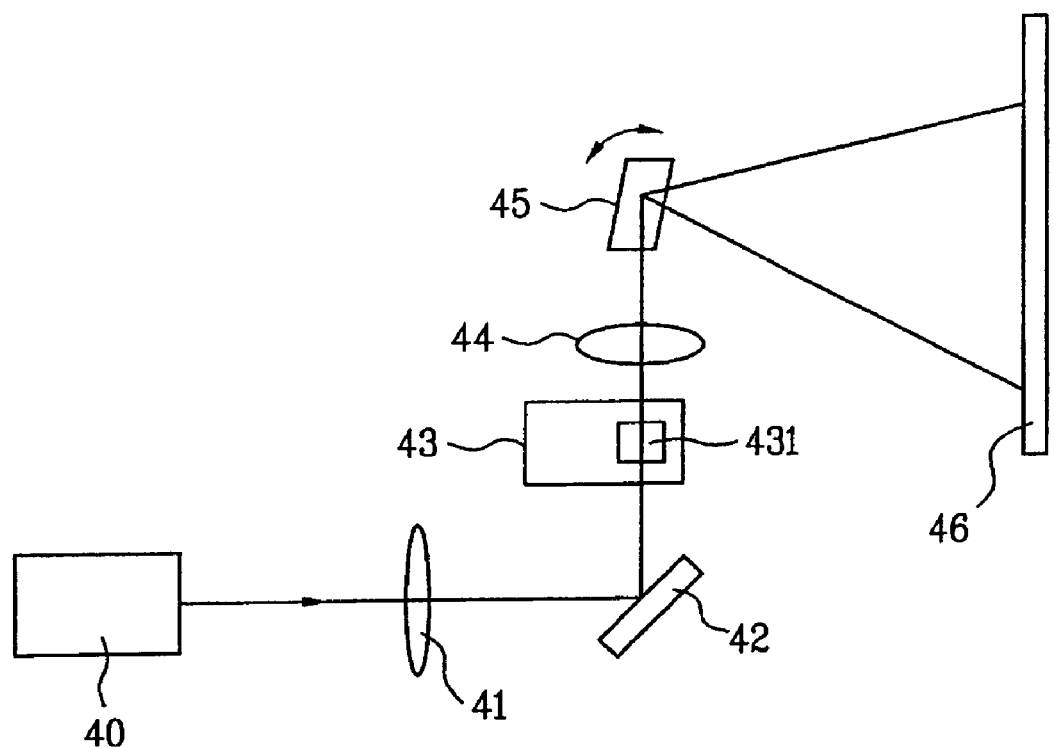
FIG. 4 is a schematic diagram of a projection display system according to the present invention.

FIG. 4 is a schematic diagram of a projection display system according to the present invention. Referring to FIG. 4, the projection display system according to the present invention includes a light source 40, a linear optical illumination system 41 transforming a light emitted from the light source 40 into a thin linear light, and a micro-mirror light modulator 42 for diverting the direction of incident light. The light emitted from the light source 40 and transformed by the linear optical illumination system is linear in the sense that it is incident upon the micro-mirror light modulator 42 along a one-dimensional line that corresponds to the linear shape of micro-mirror light modulator 42. The projection display system further includes a light transmitting layer 43 transmitting the light reflected by the light modulator 42, a projection lens 44 that projects light transmitted through the light transmitting layer 43 and enlarges the corresponding image, and a scanner 45 that scans a linear image to a screen 46.

Figure 5A:
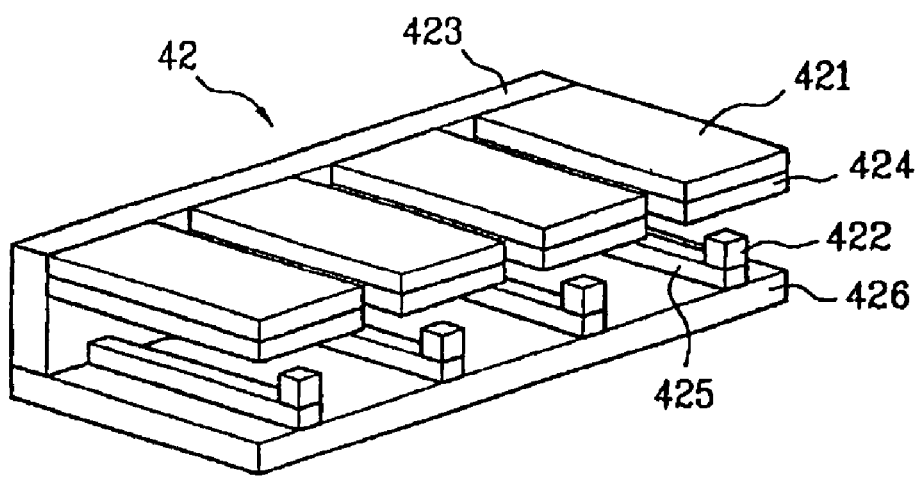
FIG. 5A is a perspective diagram of a micro-mirror light modulator in FIG. 4.

A detailed configuration of the micro-mirror light modulator 42 is explained with reference to FIG. 5A and FIG. 5B as follows. FIG. 5A is a perspective diagram of the micro-mirror light modulator of FIG. 4, while FIG. 5B is a cross-sectional diagram of the micro-mirror light modulator of FIG. 4.

Figure 5B:
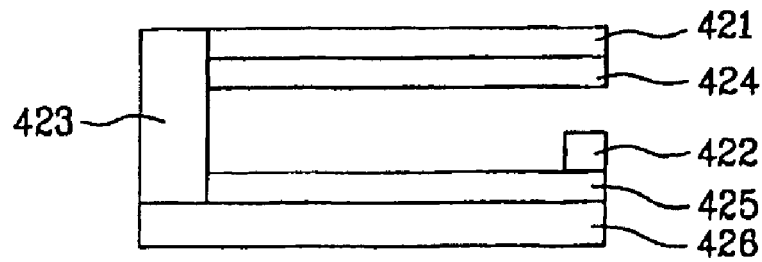
FIG. 5B is a cross-sectional diagram of a micro-mirror light modulator in FIG. 4.

Referring to FIG. 5A and FIG. 5B, a micro-mirror light modulator 42 according to the present invention includes a movable reflecting electrode 421, an electrode 422, a support structure 423 that supports the reflecting electrode 421 to act as a fixed base with respect to which the reflecting electrode 421 moves, a reflecting electrode substrate 424 on which the reflecting electrode 421 is formed, an electrode wiring layer 425 enabling an external electrical signal to be applied to the electrode 422, and a substrate 426.

One end of the reflecting electrode 421 and one end of the reflecting electrode substrate 424 are attached to the support structure 423 and need to be spaced apart from the electrode 422 at a predetermined displacement to remain substantially parallel to the substrate 425 when a voltage is not applied to the electrode 422.

When a predetermined voltage is applied to the electrode 422, the reflecting electrode 421 and the reflecting electrode substrate 424 are configured to be tilted by an attractive electrostatic force generated from the electrode 422 such that the electrode substrate 424 contacts the electrode 422.

The micro-mirror light modulator 42 of FIG. 5A and FIG. 5B generally includes a linear array of the micro-mirror elements of FIG. 5A and FIG. 5B. The linear array can be used to form a linear image associated with one row of pixels of the screen of the projection display system in response to an inputted video signal.

The reflecting electrode 421 is preferably formed from a material having high light reflectivity and good electrical conductivity, such as Ag, Al, and the like.

The light transmitting layer 43, as shown in FIG. 4, includes an aperture 431 on a predetermined part of the light transmitting layer 43. The light transmitting layer 43 and the associated aperture 431 are configured to transmit only light that is reflected from the micro-mirror light modulator 42 at a predetermined angle and are further configured to filter out other light that does not have the predetermined angle.

Figure 5C:
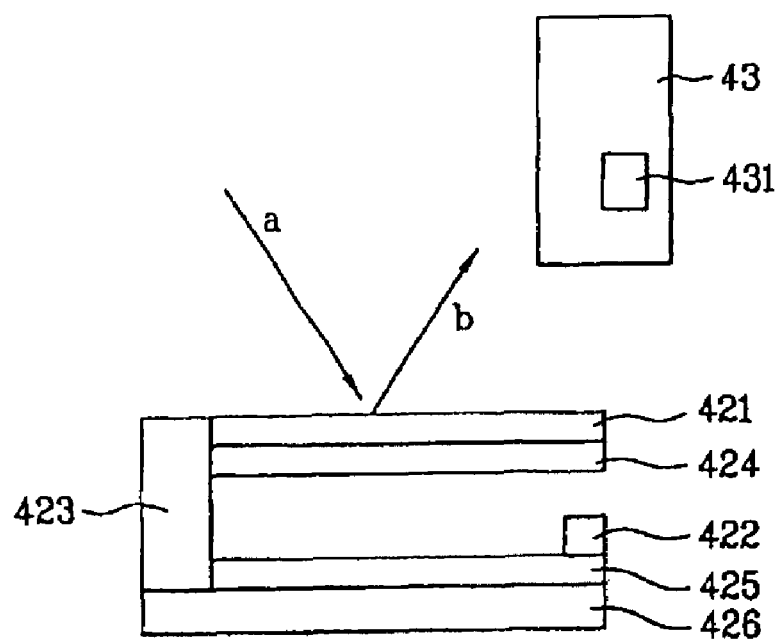
FIG. 5C is a diagram illustrating various aspects of the operation of the micro-mirror light modulator in FIG. 4.

The operation of the projection display system while a voltage is not applied to the electrode 422 of the micro-mirror light modulator 42 of FIG. 4 is explained with reference to FIG. 5C as follows. Referring to FIG. 5C, when power is turned off, there exists no electrostatic force since a voltage is not applied between the reflecting electrode 421 and the electrode 422. Hence, there is no an attractive force between the reflecting electrode 421 and the electrode 422.

In this situation, the reflecting electrode 421 maintains its horizontal state. In this example, an incident light 'a' is reflected from the reflecting electrode 421 as reflected light 'b.' In view of the geometry illustrated in FIG. 5D, the reflected light 'b' falls upon a portion of the light transmitting layer 43 other than the aperture 431. Hence, the reflected light 'b' does not transmit through light transmitting layer 43, but is instead blocked, or filtered out, by the light transmitting layer 43.

Figure 5D:
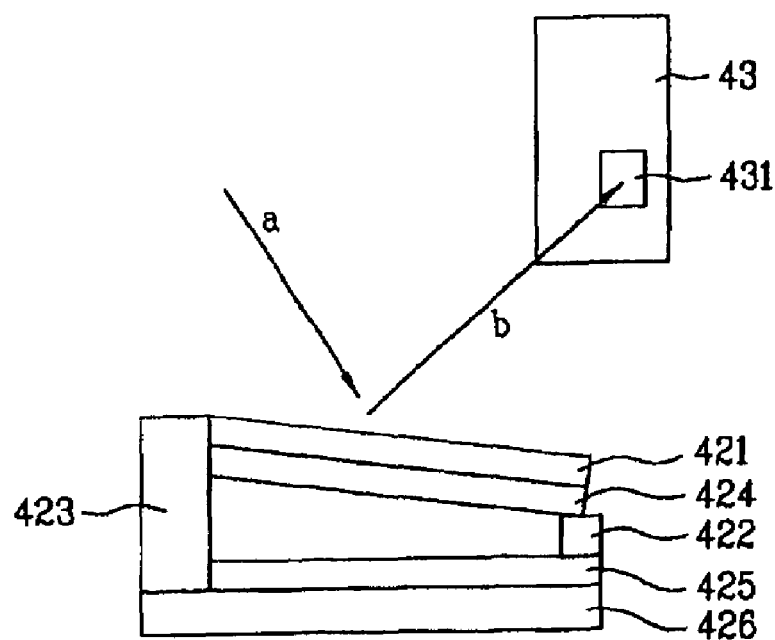
FIG. 5D is a diagram illustrating various aspects of the operation of the micro-mirror light modulator to which power is applied in FIG. 4.

In contrast, the operation of the projection display system while a voltage is applied to the electrode 422 of the micro-mirror light modulator 42 of FIG. 4 is explained with reference to FIG. 5D as follows. Referring to FIG. 5D, when power is turned on, a voltage is applied between the reflecting electrode 421 and the electrode 422 to generate an electrostatic force. Hence, an attractive force occurs between the reflecting electrode 421 and the electrode 422 so that the reflecting electrode 421 is tilted downward, which results in the reflecting electrode substrate coming into contact with the electrode 422.

In this example, the incident light 'a' is reflected at a specific angle by the tilted reflecting electrode 421 as reflected light 'b.' The reflected light 'b' as shown in FIG. 5D is directed to the aperture 431 of the light transmitting layer 43 and passes therethrough.

In view of the foregoing, the reflected light 'b' of FIG. 5C is a first portion of the reflected light from the micro-mirror light modulator of the present invention and is reflected at a first angle of reflection. In this case, the reflected light 'b' of FIG. 5C is filtered out by the light transmitting layer 43 and is generated, for example, in response to an electrical signal that indicates that the corresponding pixel is not to be illuminated. The reflected light 'b' of FIG. 5D is a second portion of the reflected light from the micro-mirror light modulator of the present invention and is reflected at a second angle of reflection. In this case, the reflected light 'b' of FIG. 5D passes through the aperture 431 of the light transmitting layer 43 and is generated, for example, in response to an electrical signal that indicates that the corresponding pixel is to be illuminated.

As mentioned above, the micro-mirror light modulator 42 generally includes a linear array of micro-mirror elements to form a linear image along one row of pixels of the screen 46 of the projection display system in one of the two dimensions of the screen from an inputted video signal. The linear image reflected by the micro-mirror light modulator 42 is directed to the projection lens 44 via the aperture 431. The projection lens 44 then enlarges and projects the linear image. The linear image is sequentially scanned by the scanner 45 to form a two-dimensional image on the screen 46.

To implement the image using the light modulator 42 and the scanner 45, brightness of each pixel needs to be adjusted. A gray scale method according to the present invention is explained with reference to FIG. 6, which is a time chart for gray scale processing of a portion of an image associated with a pixel according to the present invention.

Figure 6:
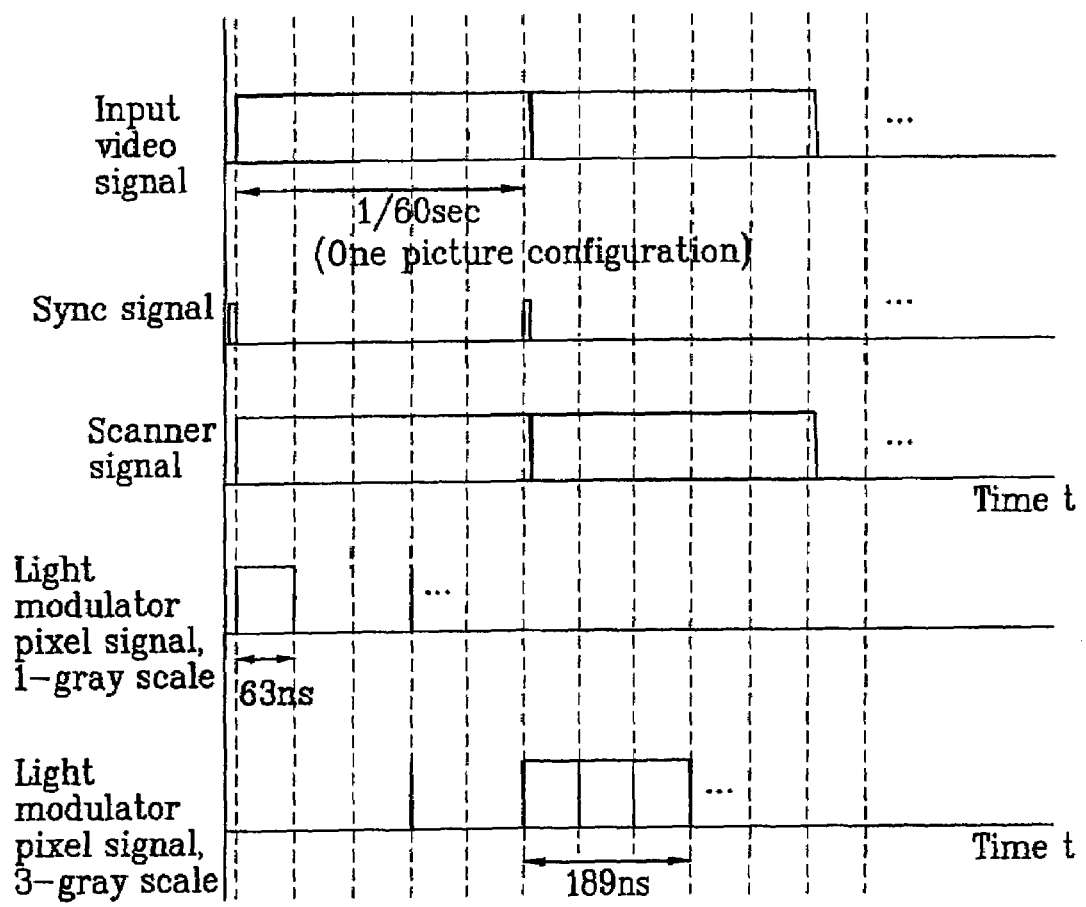
FIG. 6 is a time chart for gray scale processing of an image associated with a pixel according to the present invention.

FIG. 6 corresponds to an image rendered at 60 Hz with XGA resolution (1024×768). In this case, the light modulator 42 forms one linear image with 768 pixels of image data, which corresponds to one vertical column of pixels of the projection display system.

During this process, the scanner 45 is driven at 60 Hz to scan the linear image received from the micro-mirror light modulator 42 to form a single two-dimensional image on the screen of the projection display system for 1/60 second. One micro-mirror of the light modulator 42 forms one pixel of one linear image for 1/(60×1024) second, which results from dividing 1/60 second by the horizontal resolution of the projection display system.

The luminous intensity, or gray scale value, associated with the image rendered in one cycle on a single pixel is obtained by selecting the time ratio of mirror states over the relevant period of time. In case of a 256-value gray scale for adjusting the brightness of a single pixel, one gray scale level generated by the micro-mirror corresponds to 1/(60×1024×256) second. In other words, the micro-mirror is activated for about 63 ns to generate one unit of a 256-value gray scale.

Accordingly, the projection display system of the present invention has the following effects or advantages. First of all, the present invention facilitates the fabrication of the micro-mirror light modulator in view of the relatively simple layered configuration of the light modulator. In addition, the gap between the reflecting electrode 421 and the electrode 422 is easily formed because the gap is laterally open.

Secondly, the electrode 422 is brought into contact with the reflecting electrode substrate 424 as the reflecting electrode 421 is attracted to the electrode 422. Thus, the reflecting electrode 421 and the electrode 422 do not actually contact each other during operation of the micro-mirror light modulator 42. Moreover, the size of the electrode 422 is relatively small and has a small contact area. Thus, the micro-mirror light modulator 42 of the invention does not exhibit the sticking problems experienced in the prior art, in which moveable elements, such as operational ribbons of grating light valves, tend to stick to the electrode. Moreover, the micro-mirror elements of the invention can be switched quickly at a relatively low voltage, since the displacement of the reflecting electrode is small.

Therefore, the present invention enables the display device to be driven by a low voltage, facilitates the corresponding fabrication, reduces the product cost, and enhances contrast of the images rendered by the projection display system.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A projection display system using a micro-mirror light modulator, comprising:
   a light source;
   a linear light source illumination system that transforms a light emitted from the light source into a thin linear light;
   a micro-mirror light modulator that selectively diverts the direction of the thin linear light that is incident thereon to create reflected light, wherein the micro-mirror light modulator is configured to form a linear image that corresponds to one line of pixels on the projection display system;
   a light transmitting layer arranged to receive the reflected light from the micro-mirror light modulator and selectively transmit or filter out the reflected light, wherein the light transmitting layer filters out a first portion of the reflected light from the micro-mirror light modulator that has a first angle of reflection and transmits a second portion of the reflected light from the micro-mirror light modulator that has a second angle of reflection, wherein the thin linear light selectively diverted by the micro-mirror light modulator is received by the micro-mirror light modulator without being transmitted through the light transmitting layer;

a condenser lens that focuses the light transmitted by the light transmitting layer; and a scanner that scans the focused light such that the light forms a projected image, wherein the micro-mirror light modulator comprises:

an electrode to which a voltacie can be applied;

a reflecting electrode that is configured to reflect incident light and to deflect toward the electrode when the voltage is applied;

a support structure that supports both the reflecting electrode and the electrode, and acts as a shaft of the reflecting electrode that is movable; and a substrate acts as a fixed base on which the support structure and the electrode are formed.

2. The projection display system of claim 1, wherein the electrode is spaced apart from the reflecting electrode at a predetermined displacement.

3. The projection display system of claim 1, wherein the micro-mirror light modulator and the light transmitting layer are configured such that the reflected light from the micro-mirror light modulator can be used to adjust the brightness of a pixel of the projection display system by selectively adjusting the duration of the transmission of the reflected light through an aperture of the light transmitting layer using the micro-mirror light modulator.

4. The projection display system of claim 1, wherein the micro-mirror light modulator is configured to render a two-dimensional image by sequentially forming linear images that correspond to different lines of pixels of the projection display system as the scanner scans the sequentially-formed linear images.

5. The projection display system of claim 1, wherein the support structure is perpendicular to the substrate, the electrode and the reflecting electrode.

6. In a projection display system that includes a micro-mirror light modulator, a method for forming an image using the projection display system, comprising:

in response to an electrical signal that encodes an image, operating the micro-mirror light modulator to selectively divert the direction of an incident linear light generated by a light source to create reflected light;

using a light transmitting layer of the projection display system, selectively filtering out a first portion of the reflected light and transmitting a second portion of the reflected light according to an angle of reflection of the reflected light, wherein the light transmitting layer and the micro-mirror light modulator are arranged such that the micro-mirror light modulator receives the incident linear light generated by the light source and such that the light transmitting layer only receives the reflected light created by the micro-mirror light modulator;

using the transmitted second portion of the reflected light to form the image wherein the micro-mirror light modulator comprises:

an electrode to which a voltacie can be applied;

a reflectinci electrode that is conficiured to reflect incident lighht and to deflect toward the electrode when the voltage is applied:

a support structure that supports both the reflecting electrode and the electrode, and acts as a shaft of the reflecting electrode that is movable; and a substrate acts as a fixed base on which the support structure and the electrode are formed.

7. The method of claim 6, wherein the micro-mirror light modulator comprises:

an electrode to which a voltage can be applied;

a reflecting electrode that is configured to reflect the incident linear light and to deflect toward the electrode when the voltage is applied; and a support structure that supports both the reflecting electrode and the electrode.

8. The method of claim 6, wherein:

the micro-mirror light modulator further comprises a plurality of reflecting electrodes that are positioned in a linear array; and the linear array of reflecting electrodes correspond to pixels of a row of pixels on a screen of the projection display system.

9. The method of claim 6, wherein operating the micro-mirror light modulator to selectively divert the direction of an incident linear light comprises:

in response to the electrical signal indicating that a pixel is to not be illuminated, applying no voltage to the micro-mirror light modulator, such that the incident linear light is reflected as the first portion of the reflected light at a first angle of reflection;

in response to the electrical signal indicating that the pixel is to be illuminated, applying a voltage to the micro-mirror light modulator, such that the incident linear light is reflected as the second portion of the reflected light at a second angle of reflection.

10. The method of claim 9, wherein the reflecting electrode deflects toward the electrode when the voltage is applied, such that the reflecting electrode is tilted at an angle that is related to the second angle of reflection.

11. The method of claim 10, wherein, when the voltage is not applied, the reflecting electrode maintains a position that is related to the first angle of reflection.

12. The method of claim 10, wherein a reflecting electrode substrate of the reflecting electrode contacts the electrode when the reflecting electrode deflects toward the electrode, such that the reflecting electrode does not contact the electrode.

13. The method of claim 6, wherein:

the light transmitting layer includes an aperture formed therein; and selectively filtering out and transmitting includes:

selectively filtering out the first portion of the reflected light as the first portion of the reflected light falls upon a portion of the light transmitting layer other than the aperture; and selectively transmitting the second portion of the reflected light as the second portion of the reflected light passes through the aperture.

14. The method of claim 6, wherein using the transmitted second portion of the reflected light to form the image comprises:

sequentially forming linear images that correspond to different lines of pixels of the projection display system; and scanning the sequentially-formed linear images to form a two-dimensional image.

15. The method of claim 6, further comprising applying a gray scale value to a pixel of the image by selecting a time ratio of states of a micro-mirror of the micro-mirror light modulator over a period of that corresponds to the display of image data on the pixel.

16. In a projection display system that includes a micro-mirror light modulator, a method for applying a gray scale value to a portion of an image associated with a pixel of the projection display system, comprising:
 in response to an electrical signal that encodes an image, operating a micro-mirror element of micro-mirror light modulator that corresponds to a pixel of the projection display system, the micro-mirror element being operated by:
  moving between a first state in which an incident light reflects from the micro-mirror element at a first angle of reflection and a second state in which the incident light reflects from the micro-mirror element, at a second angle of reflection; and
  selecting the time ratio of the first state and the second state over a period of time that corresponds to one cycle of the pixel, wherein the time ratio is selected to correspond to the gray scale value to be applied to the pixel; and
 using the incident light that has been reflected at the second angle of deflection to illuminate the pixel at the gray scale value, wherein the incident light that has been reflected at the second angle is transmitted by a light transmitting layer that is arranged in the projection display system to transmit the incident light that has been reflected at the second angle without transmitting the incident light received by the micro-mirror element wherein the micro-mirror liciht modulator comprises:
  an electrode to which a voltage can be applied;
  a reflecting electrode that is configured to reflect incident light and to deflect toward the electrode when the voltage is applied;
  a support structure that supports both the reflecting electrode and the electrode, and acts as a shaft of the reflecting electrode that is movable; and
  a substrate acts as a fixed base on which the support structure and the electrode are formed.

17. The method of claim 16, wherein the projection display system operates at approximately 60 Hz.

18. The method of claim 16, wherein the cycle of the pixel is substantially equal to one second divided by the product of the frequency of the projection display system and the number of pixels in one of the two dimensions of the projection display system.

19. The method of claim 18, wherein:
 the frequency of the projection display system has a frequency of approximately 60 Hz;
 the number of pixels in said one of the two dimensions of the projection display system is 1024; and
 the cycle of the pixel is approximately equal to 1/(60.times.1024).

* * * * *